(12) United States Patent
Augenstein et al.

(10) Patent No.: US 9,599,413 B2
(45) Date of Patent: Mar. 21, 2017

(54) HEAT EXCHANGER, IN PARTICULAR INTERCOOLER

(71) Applicant: MAHLE INTERNATIONAL GmbH, Stuttgart (DE)

(72) Inventors: Claus Augenstein, Gerlingen (DE); Harald Bronner, Bad Liebenzell-Unterhaugstett (DE); Stephan Posset, Bad Wimpfen (DE); Silvia-Helena Klipphahn, Stuttgart (DE); Eduard Tyulyukovskiy, Stuttgart (DE)

(73) Assignee: MAHLE International GmbH, Stuttgart (DE)

( * ) Notice: Subject to any disclaimer, the term of this patent is extended or adjusted under 35 U.S.C. 154(b) by 246 days.

(21) Appl. No.: 14/070,790

(22) Filed: Nov. 4, 2013

(65) Prior Publication Data

US 2014/0054018 A1 Feb. 27, 2014

Related U.S. Application Data

(63) Continuation of application No. PCT/EP2012/057982, filed on May 2, 2012.

(30) Foreign Application Priority Data

May 2, 2011 (DE) .................. 10 2011 075 071

(51) Int. Cl.
*F28F 7/02* (2006.01)
*F28F 9/02* (2006.01)
(Continued)

(52) U.S. Cl.
CPC .............. *F28F 9/02* (2013.01); *F02B 29/045* (2013.01); *F28D 1/05366* (2013.01);
(Continued)

(58) Field of Classification Search
CPC ........ F28F 9/02; F28F 9/04; F28F 1/32; F28F 1/10; B21D 53/02; B21D 53/06; B21D 53/08
(Continued)

(56) References Cited

U.S. PATENT DOCUMENTS 2,488,627 A * 11/1949 Hisey ............................ 165/151
3,245,465 A * 4/1966 Young ....................... F28F 1/32
165/148

(Continued)

FOREIGN PATENT DOCUMENTS

CN 1542398 A 11/2004
CN 1853083 A 10/2006
(Continued)

OTHER PUBLICATIONS

Chinese Office Action for Chinese Application No. 201280021550.0 date Feb. 16, 2015 with English translation.
(Continued)

*Primary Examiner* — Len Tran
*Assistant Examiner* — Gustavo Hincapie Serna
(74) *Attorney, Agent, or Firm* — Muncy, Geissler, Olds & Lowe, P.C.

(57) ABSTRACT

A heat exchanger, in particular an intercooler, is provided that includes at least one collector box that has a base. At least one tube engages into a passage in an approximately perpendicular manner with respect to the base, the passage protruding out of the base and surrounding a tube end, and the passage has a rectangular cross-section that is adapted to the outer circumference of the tube. The aim of the invention is to further extend the service life of the heat exchanger with a further reduction of the wall thickness of the collector box base as well as of the tube. This is achieved in that a wall thickness of the passage is thinned at least in a corner region.

10 Claims, 4 Drawing Sheets

(51) Int. Cl.
*F02B 29/04* (2006.01)
*F28D 1/053* (2006.01)
*F28D 21/00* (2006.01)

(52) U.S. Cl.
CPC .... *F28F 9/0246* (2013.01); *F28D 2021/0082* (2013.01); *Y02T 10/146* (2013.01)

(58) Field of Classification Search
USPC .......................... 165/165, 173, 178; 200/289
See application file for complete search history.

(56) References Cited

U.S. PATENT DOCUMENTS

| | | | |
|---|---|---|---|
| 3,771,595 A * | 11/1973 | Slaasted ...................... 165/151 |
| 4,234,041 A * | 11/1980 | Melnyk ......................... 165/173 |
| 4,269,267 A * | 5/1981 | Labrande ................ B21C 37/22 165/181 |
| 4,465,129 A * | 8/1984 | Baldensperger et al. ..... 165/153 |
| 4,965,431 A * | 10/1990 | Monteleone ......... B23K 9/0288 219/123 |
| 5,092,397 A | 3/1992 | Fuhrmann et al. |
| 5,366,006 A | 11/1994 | Lu et al. |
| 5,423,112 A * | 6/1995 | Murphy et al. .......... 29/890.043 |
| 5,706,695 A * | 1/1998 | Helms et al. ................... 72/335 |
| 6,129,146 A * | 10/2000 | Krueger et al. .............. 165/173 |
| 6,928,849 B1 | 8/2005 | Yamada |
| 6,932,152 B2 | 8/2005 | Iwasaki et al. |
| 7,413,006 B2 | 8/2008 | DeGroot et al. |
| 8,074,708 B2 * | 12/2011 | Sugito ................. F28D 1/05366 165/173 |
| 2003/0127216 A1* | 7/2003 | Yamamoto ............. B21D 39/06 165/151 |
| 2007/0000657 A1 | 1/2007 | Emrich et al. |
| 2008/0121386 A1* | 5/2008 | Hakamata et al. ........... 165/173 |
| 2008/0121388 A1* | 5/2008 | Auchter ................. B21D 28/24 165/178 |
| 2010/0038063 A1 | 2/2010 | Saumweber et al. |
| 2010/0108304 A1* | 5/2010 | Nies ..................... B21D 53/085 165/173 |
| 2011/0139424 A1 | 6/2011 | Bensel et al. |

FOREIGN PATENT DOCUMENTS

| | | |
|---|---|---|
| CN | 101050932 A | 10/2007 |
| DE | 10 16 029 A1 | 10/2001 |
| DE | 103 43 239 A1 | 4/2005 |
| DE | 10 2007 016 528 A1 | 11/2007 |
| DE | 10 2007 059 673 A1 | 8/2008 |
| EP | 0 389 970 A2 | 10/1990 |
| EP | 0 745 823 A1 | 12/1996 |
| EP | 2 151 655 A2 | 2/2010 |
| JP | S 60-82225 A | 5/1985 |
| JP | S 60-122689 U | 8/1985 |
| JP | H 02-282698 A | 11/1990 |
| JP | 2004-202549 A | 7/2004 |
| JP | 2004-286358 A | 10/2004 |
| JP | 2008-032384 A | 2/2008 |
| JP | 2011-064403 A | 3/2011 |
| RU | 2 107 572 C1 | 3/1998 |
| RU | 2 129 054 C1 | 4/1999 |
| WO | WO 2009/149838 A1 | 12/2009 |
| WO | WO 2010/003445 A1 | 1/2010 |

OTHER PUBLICATIONS

Japanese Office Action for Japanese Application No. 2014-508774 date Feb. 2, 2016 with partial English translation.

* cited by examiner

HEAT EXCHANGER, IN PARTICULAR INTERCOOLER

This nonprovisional application is a continuation of International Application No. PCT/EP2012/057982, which was filed on May 2, 2012, and which claims priority to German Patent Application No. 10 2011 075 071.1, which was filed in Germany on May 2, 2011, and which are both herein incorporated by reference.

BACKGROUND OF THE INVENTION

Field of the Invention

The invention relates to a heat exchanger, in particular an intercooler, comprising at least one header box that has a plate, wherein at least one tube approximately perpendicular to the plate engages a passage that projects out of the plate and surrounds a tube end, wherein the passage has a quasi-rectangular cross-section matched to the outer circumference of the tube.

Description of the Background Art

In order to achieve a performance improvement in an internal combustion engine, the air to be delivered for combustion can be compressed, for example with a turbocharger, before it is delivered to the combustion chambers of the internal combustion engine. However, the compression of the air simultaneously entails a significant heating of the same, which is disadvantageous for optimal functioning of the combustion process. For example, the heating may bring about premature ignition or increased nitrogen oxide emission. In order to avoid the adverse consequences of the overheated air delivered for combustion, a turbocharger is followed by a heat exchanger implemented as an intercooler, with which the compressed air is cooled to a permissible temperature prior to its combustion.

Known from DE 103 43 239 A1, which corresponds to US 2007/0000657, is a heat exchanger that has tubes and at least one header box, wherein the header box comprises at least one tube plate with passages, and the passages are bordered by side walls. In this way, the mechanical loading on the joint between the tube and plate is reduced without additional expenditure of material.

In the conventional art, in the case of reduced tube wall thicknesses or reduced plate thicknesses, the strength of the tube/plate joint is not always ensured, resulting in a reduced lifetime of an intercooler.

The stresses responsible for the failure of the intercooler arise here from non-uniform expansion of the individual components of the intercooler and the deformation or displacement resulting therefrom. The stresses can be attributed to the differing thermal conditions in the intercooler.

Known from DE 10 2007 059 673 A1 is a heat exchanger for exchanging between a first fluid and a second fluid, in which the service life of the heat exchanger with regard to cyclic thermal stress is extended by the means that a distance value, at least at a transition between the narrow side of the tube and the wide side of the tube is less than a distance value at the wide side of the tube in such a way that stresses in the region of the transition are reduced.

Another embodiment of passage geometry is known from DE 10 2007 016 528 A1, which corresponds to U.S. Pat. No. 7,413,006, where a header plate for use in a heat exchanger is disclosed. In order to improve loading of the tube/plate joint, the passage is formed such that it matches the outside of the associated tube.

However, a further reduced tube wall thickness below 0.5 mm or further reduced plate thicknesses below 3 mm result in fairly large deformations and displacements of the intercooler, especially in the tube/plate region. In this event, especially in the tube corner radii, the transition region between the relatively stiff passage and the thin tube, peak stresses arise that result in tearing between plate and tube. For this reason, the tube wall thickness and the plate thickness cannot be reduced further.

SUMMARY OF THE INVENTION

It is therefore an object of the invention to provide a heat exchanger in which the service life of the heat exchanger is maintained or can be further extended without detriment despite the use of tubes with even smaller tube wall thickness and plates with further reduced thickness.

According to an embodiment of the invention, the object is attained in that a wall thickness of the passage is reduced in at least one corner region, in particular by tool forming, relative to a narrow side and a wide side. This has the advantage that the abrupt change in stiffness between the stiff passage and the thin-walled tube is reduced as a result of the selective thinning of the passage in this region. In this design, the deformation in the tube corner region of the heat exchanger caused by temperature influences is distributed over a larger region of the passage, and thus the peak stress is reduced. As a result, the service life of the heat exchanger is extended despite the reduction in the tube wall thicknesses and/or plate thicknesses. Thinning by tool forming should be understood to mean that the passage bears against the tool on both sides in an advantageous manner during the processing operation, which entails control of the thickness of the passage by the tool.

In an embodiment, the reduced wall thickness of the corner region can extend radially with respect to the tube. Because of this design, this corner region is made as pliant as possible by the reduced wall thickness in order to adapt to the stresses that occur and reliably prevent tearing of the tube in this region.

In an embodiment, starting from the corner region of the passage, the reduced wall thickness can extend at least partially into the narrow side and/or the wide side of the passage. Thus, the reduced wall thickness is not limited to the corner region. As a result of the transition to the narrow or wide sides of the passage, the thickness reduction is matched back to the normal wall thickness of the narrow side and wide side, by which means a defined transition between the plate and tube is made possible in the region of the passage, since the passage is made elastic in this region. Additional manufacturing steps, for example in the form of the installation of a tube reinforcement or a block production process, can be eliminated while preserving the rectangular cross-section of the tube, which is optimal in terms of thermodynamic aspects, making it possible to reduce the production costs of the heat exchanger.

In an embodiment, the reduced wall thickness of the corner region can be continuously matched to the relevant wall thickness of the narrow side and/or wide side of the passage. In this way, the stresses arising in the corner region of the passage are distributed in the direction of the narrow side or wide side and are gradually transmitted thereto, as a result of which tears in this region are reliably suppressed.

In an embodiment, starting from the continuously increasing, reduced wall thickness that extends into the wide side, an abrupt transition to a specified wall thickness of the wide side takes place at least at the width of the passage. This abrupt transition is already positioned in the region of the wide side, where lower peak stresses arise, so that no tears are to be expected in this region on the wide side of the passage.

In an embodiment, the reduced wall thickness of the corner region of the passage can be 0.1 to 0.8 mm. As a result, a very steady and above all pliant transition between tube and plate at the corner region is implemented. Although the corner region is very thin-walled in design, the service life of the heat exchanger is further extended even when using this very thin but elastic wall region of the passages.

In another embodiment, the reduced wall thickness of the corner region of the passage can extend axially with respect to the tube. This embodiment results in good support of the tube inserted into the passage.

In an embodiment, the reduced wall thickness of the passage can increase starting from the tube and proceeding in the direction of the plate of the header box. In this way, the corner region can be formed to be as high as possible, as a result of which the tube is reliably positioned in the passage and tearing in the corner region is prevented nevertheless.

In an embodiment, the height of the passage can be made constant in the corner region. This facilitates the production process for the plate with the passage in the plate.

In an embodiment, the height of the passage in its corner region increases, in particular continuously, toward the wide side. This ensures that the wide side of the passage allows for reliably receiving and stabilizing the tube that is inserted into the passage.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
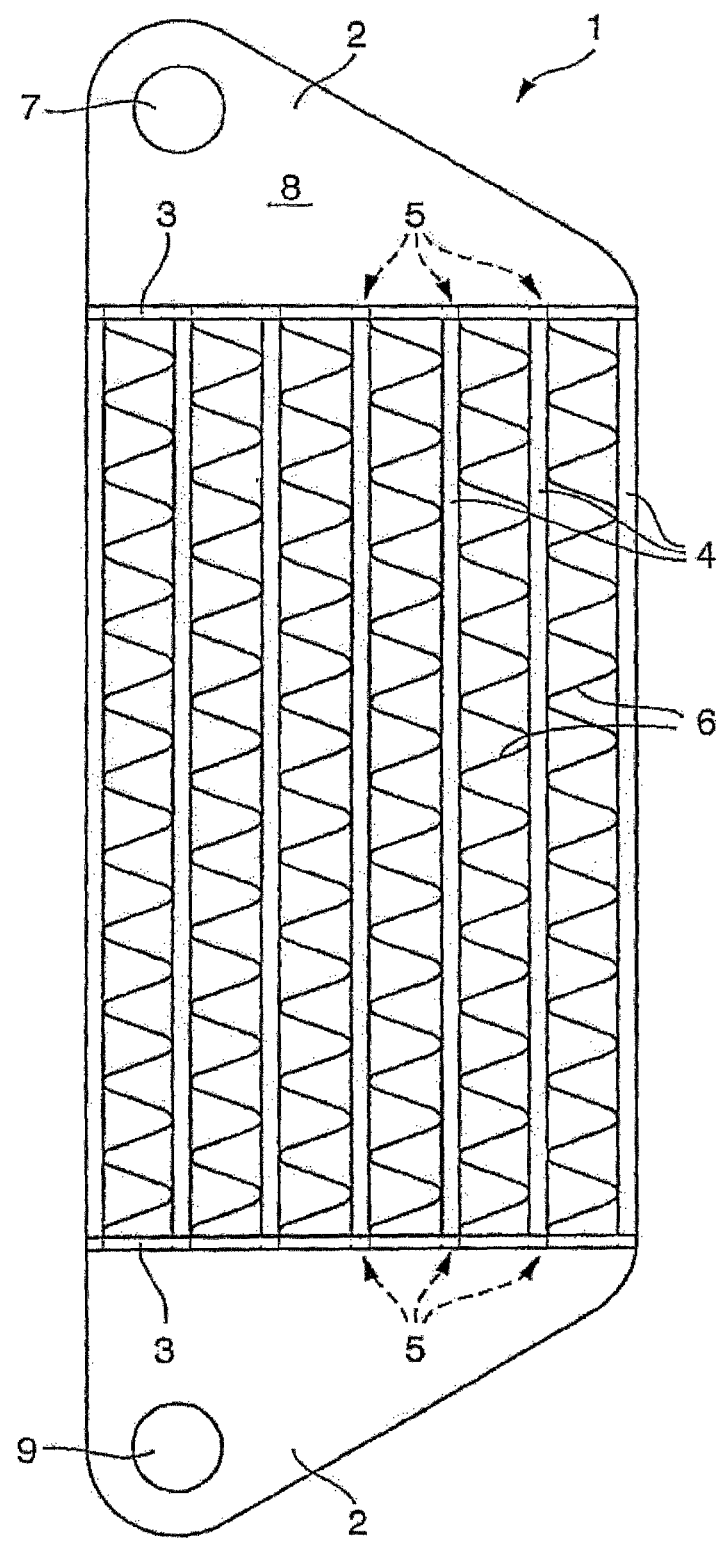
FIG. 1 illustrates longitudinal section through a heat exchanger.

FIG. 1 shows a heat exchanger 1 that has two opposing header boxes 2, wherein each of the header boxes 2 is provided on one side with an essentially flat, slab-like plate 3. The header boxes 2 here are arranged on the heat exchanger 1 such that their plates 3 face one another and extend parallel to one another. Located between the header boxes 2 or between their plates 3, perpendicular to the plates 3, are tubes 4, preferably flat tubes, that are placed adjacent to one another and extend parallel to one another, and whose ends pass through the plates 3 in openings 5 provided for this purpose, thereby connecting the header boxes 2 in a communicating manner. Cooling ribs 6, which are zigzag shaped, for example, are placed between adjacent tubes 4. The tubes 4 are attached to the header boxes 2 or their plates 3 by soldering.

When the heat exchanger 1 is designed as an intercooler, the hot air compressed by a turbocharger that is not shown in detail enters an interior 8 of the upper header box 2 through an inlet opening 7 provided in the upper header box 2. The air to be cooled distributes itself in the interior 8, enters the tubes 4, and flows through them. In this process, cooling of the hot air takes place, and the cooled air in turn enters an interior 8 of the second, lower header box 2 at the other ends of the tubes 4. The lower header box 2 contains an outlet opening 9 through which the air, which has in the meantime been cooled, is delivered to the appropriate user, for example the internal combustion engine.

The cooling of the air in the region of the tubes 4 takes place with the aid of the cooling ribs 6 located between the tubes 4. The tubes 4 and the cooling ribs 6 located between them are exposed to a cooling air flow. In this process, the heat energy of the hot air flowing through the tubes 4 is transferred to the tubes 4 and from there to the cooling ribs 6, and is then carried away by the cooling air flow.

Figure 2:
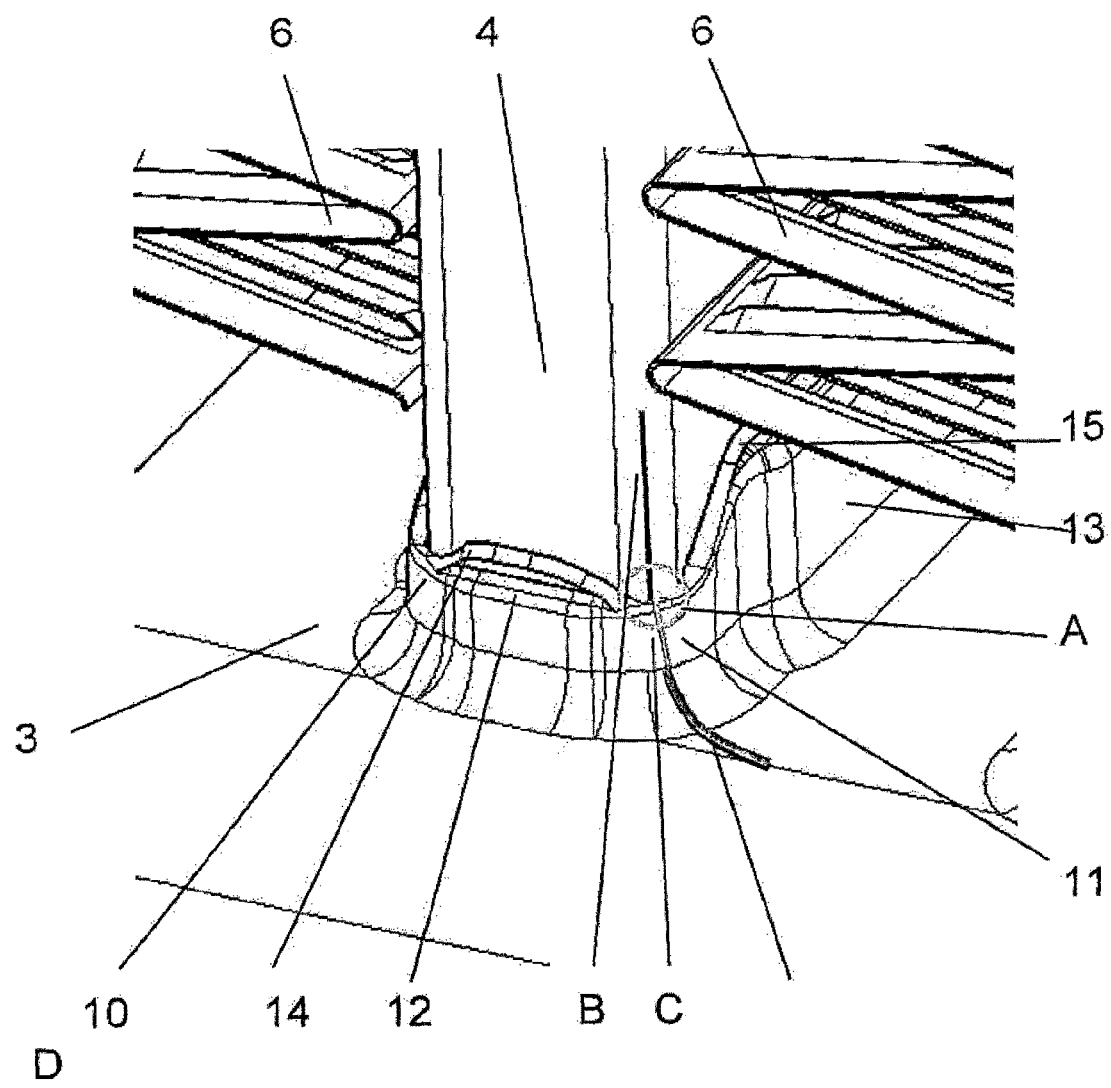
FIG. 2 illustrates an exemplary embodiment for a tube/plate joint according to the invention.

FIG. 2 shows a section of a tube 4 that is attached to the plate 3 of a header box 2. In this case, the tube 4, which has a quasi-rectangular cross-section, is carried in a passage 10 that is punched out of the plate 3 and surrounds the opening 5, not shown in detail, in the plate 3. The passage 10 is thus a part of the plate 3 and consequently also of the tube/plate joint. The corner region 11 of the passage 10 adjoins a narrow side 12 on one side, while the other side of the corner region 11 transitions to a wide side 13. Both the narrow side 12 and the wide side 13 have insertion aids 14 or 15 facing in the direction of the tube 4, which assist the installation of the tube 4 in the passage 10.

Figure 3:
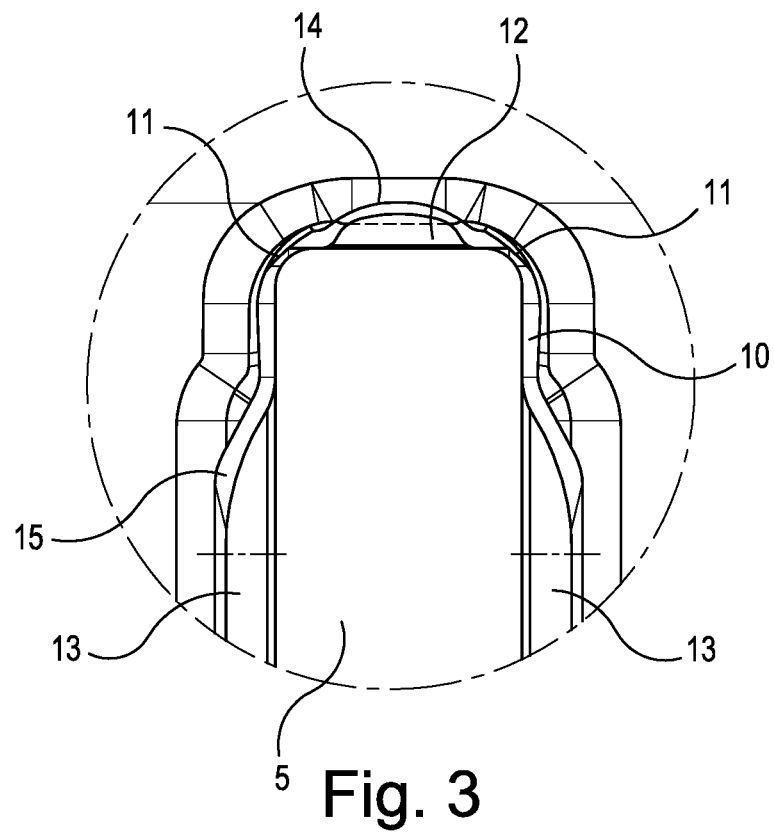
FIG. 3 illustrates top view of a section of the passage of the tube/plate joint from FIG. 2.

FIG. 3 shows a top view of the narrow side 12 of the passage 10 from the viewpoint of the tube 4, wherein long wide sides 13 extend along both sides of the narrow side 12. In this way, it is suggested that the passage 10 has a quasi-rectangular cross-section that is matched to the cross-section of the tube 4 and is optimal for the tube 4 in terms of thermodynamic aspects. The wide side 13 in this design has a wall thickness of approximately 1.5 mm, while the narrow side 12 has a wall thickness of 1 mm. The corner region 11 of the passage 10 extending between the narrow side 12 and the wide side 13 has a reduced wall thickness relative to the wide side 13 or the narrow side 12. The reduced wall thickness here is less than 1 mm and is preferably 0.1 to 0.8 mm.

Figure 4:
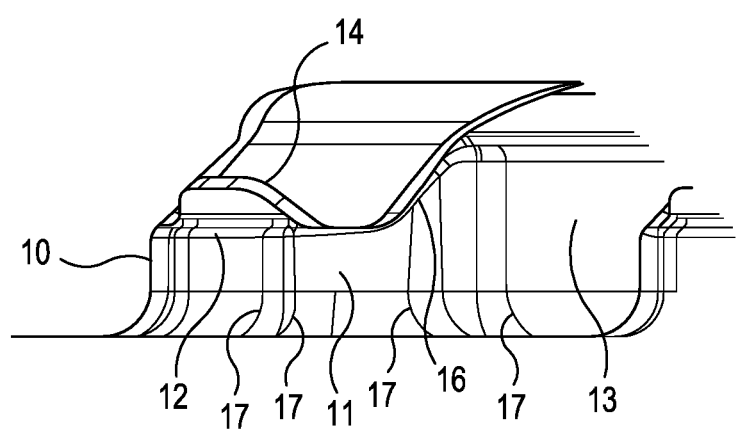
FIG. 4 is a view of the corner region of the passage of the tube/plate joint from FIG. 2 from a 45° angle.

The reduced wall thickness is not limited to the corner region 11, but extends into the initial sections of the narrow side 12 and the wide side 13 up to transition lines 17 (see FIG. 4). As is evident from FIG. 3, an initial section of 0.5 to 1.5 mm in the narrow side 12 of the passage 10 adjacent to the corner region 11 is implemented with the reduced wall thickness, as well as an initial section of 0.5 to 5.0 mm in the wide side 13 of the passage 10 that likewise is adjacent to the corner region 11. In an advantageous manner, the reduced wall thickness is not implemented with a constant wall thickness, but instead the reduced wall thickness increases continuously from a thinnest place located exactly at the radius of the corner region 11, to a thicker wall thickness, for example 0.8 mm. Then, once the wall thickness has reached the transition line 17, for example, 0.8 mm in the initial region of the wide side 13, the wall thickness is abruptly increased to 1.5 mm.

The outer surface of the passage 10 in this corner region 11, or in the outer sections of the narrow side 12 or the wide side 13, can extend parallel to the inside contour of the passage 10 or can rise continuously. The outer surface in this design is slightly conical in shape, as is evident from FIG. 2.

FIG. 4 shows a view of the corner region 11 of the passage 10 from a 45° angle. It is evident therefrom that the height of the passage 10 is not constant. Starting from a lesser height of the narrow side 12, the height of the passage 10 increases continuously in the corner region 11.

The same applies to the reduced wall thicknesses of the adjacent initial sections of the narrow side 12 and wide side 13. The height of the passage 10 in the region of reduced wall thickness is ideally 3 to 6 mm, and can also increase continuously in the region of reduced thickness (increase 16). A constant implementation of the height over the entire corner region 11 and the adjacent initial sections of the narrow side 12 and wide side 13 is likewise possible.

Figure 5:
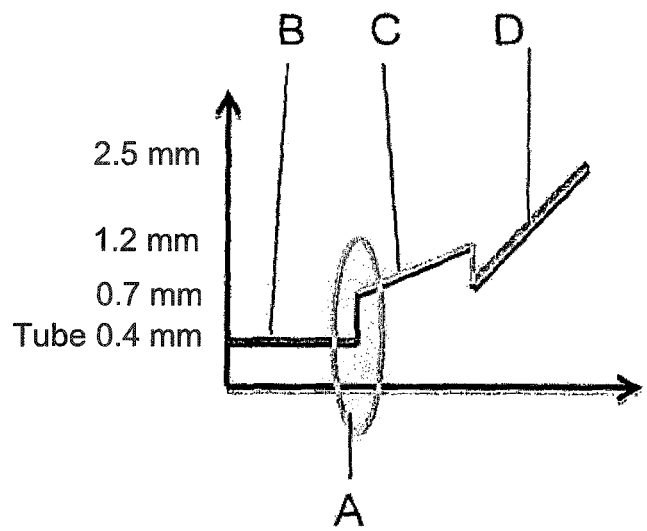
FIG. 5 illustrates a material thickness of the passage in the corner region in accordance with FIG. 2.
Figure 6:
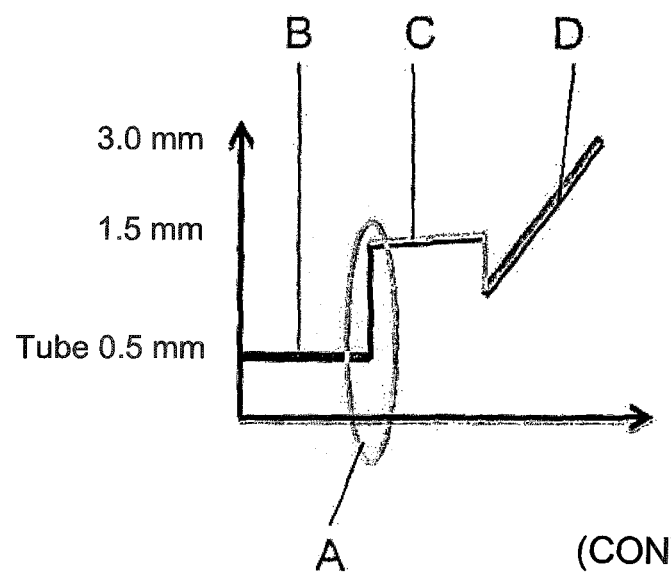
FIG. 6 illustrates material thickness of the passage in the corner region in accordance with the conventional art

In FIGS. 5 and 6, the region of the greatest stresses present at the corner region 11 of the passage 10 is indicated as region A. According to the present invention, the wall thickness of the passage 10 is designed to be the thinnest in region A, where the greatest peak stresses arise, and is, for example, 0.3 mm.

As a result of the reduction in the abrupt transition in material thickness in the corner region 11 due to the reduced wall thickness of the passage 10, the high stresses, and thus also the peak stresses, can be significantly reduced as compared to the prior art, although the thickness of the plate 3 and also the wall thickness of the tube 4 are sharply reduced.

Because of the elimination of additional material and additional production steps, the present invention proposes a heat exchanger 1 in which the wall thicknesses of both the tube and the plate 3 are further reduced as compared to the prior art, reducing the costs of the heat exchanger, while preserving the rectangular cross-section of the flat tube 4, which is optimal in terms of thermodynamic aspects. The service life of the heat exchanger is extended in spite of this reduction in material.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A heat exchanger comprising:
   at least one header box that has a plate; and
   at least one tube arranged approximately perpendicular to the plate engages a passage that projects out of the plate and surrounds a tube end,
   wherein the passage has a quasi-rectangular cross-section matched to an outer circumference of the tube, such that the passage has two narrow sides and two wide sides connected together by four corner regions,
   wherein a wall thickness of at least one corner region is reduced by tool forming such that the wall thickness of the at least one corner region is thinner than a wall thickness of one of the narrow sides and one of the wide sides of the passage that are connected thereto, and
   wherein the wall thickness of the at least one corner region and the wall thickness of the one of the narrow sides and the one of the wide sides of the passage are each measured as a distance from an interior surface of the passage to an exterior surface of the passage.

2. The heat exchanger according to claim 1, wherein the reduced wall thickness of the corner region extends radially with regard to the tube.

3. The heat exchanger according to claim 2, wherein, starting from the corner region of the passage, the reduced wall thickness extends at least partially into one of the narrow sides and/or one of the wide sides of the passage, and wherein an end point of the extension of the reduced wall thickness into the narrow side and/or the wide side of the passage is a transition line at which the thickness of the passage changes to the thickness of the narrow side and/or the wide side.

4. The heat exchanger according to claim 3, wherein the reduced wall thickness of the corner region continuously increases in thickness from a thinnest point located at the radius of the corner region towards the narrow side and/or the wide side of the passage.

5. The heat exchanger according to claim 4, wherein, at least on the wide side of the passage, the thickness of the reduced wall thickness continuously increases until reaching the transition line on the wide side of the passage, and wherein at the transition line, the wall thickness of the passage is the wall thickness of the wide side.

6. The heat exchanger according to claim 2, wherein the reduced wall thickness of the corner region of the passage is 0.1 to 0.8 mm.

7. The heat exchanger according to claim 1, wherein a height of the passage is made constant in its corner region.

8. The heat exchanger according to claim 1, wherein a height of the passage in its corner region increases continuously toward one of the wide sides.

9. The heat exchanger according to claim 1, wherein the heat exchanger is an intercooler.

10. The heat exchanger according to claim 1, wherein the passage includes a base portion and an upright portion,
    wherein the upright portion extends perpendicular to the plate,
    wherein the base portion tapers from the plate to the upright portion, and
    wherein the two narrow sides, the two wide sides and the four corner regions are provided at the upright portion of the passage.

* * * * *